US009398415B1

(12) United States Patent
Woods et al.

(10) Patent No.: US 9,398,415 B1
(45) Date of Patent: Jul. 19, 2016

(54) SYSTEM, METHOD, AND COMPUTER PROGRAM FOR DETERMINING GEO-LOCATION OF USER EQUIPMENT FOR A SUBSCRIBER THAT IS IN SIMULTANEOUS COMMUNICATION WITH A CELLULAR NETWORK AND A WI-FI NETWORK

(71) Applicant: Amdocs Software Systems Limited, Dublin (IE)

(72) Inventors: Ashley Lewis Woods, Swindon (GB); Stephen John Plain, Bath (GB); Sapan Goel, Gurgaon (IN)

(73) Assignee: Amdocs Software Systems Limited, Dublin (IE)

( * ) Notice: Subject to any disclaimer, the term of this patent is extended or adjusted under 35 U.S.C. 154(b) by 74 days.

(21) Appl. No.: 14/286,942

(22) Filed: May 23, 2014

(51) Int. Cl.
*H04W 4/02* (2009.01)
*H04W 52/02* (2009.01)

(52) U.S. Cl.
CPC .......... *H04W 4/023* (2013.01); *H04W 52/0212* (2013.01)

(58) Field of Classification Search
None
See application file for complete search history.

(56) References Cited

U.S. PATENT DOCUMENTS

| | | | | |
|---|---|---|---|---|
| 2009/0203370 A1* | 8/2009 | Giles | ................ | H04M 1/72572 455/418 |
| 2009/0312036 A1* | 12/2009 | Alizadeh-Shabdiz | | G01S 5/0263 455/456.1 |
| 2012/0087212 A1* | 4/2012 | Vartanian | ................ | G01S 15/08 367/118 |
| 2012/0099969 A1* | 4/2012 | Gilman | ..................... | F01D 5/22 415/170.1 |
| 2012/0209716 A1* | 8/2012 | Burns | ..................... | G06Q 30/02 705/14.64 |
| 2013/0084856 A1* | 4/2013 | Prasad | .............. | H04W 36/0088 455/434 |
| 2014/0195345 A1* | 7/2014 | Lyren | ................. | G06Q 30/0271 705/14.53 |
| 2014/0298433 A1* | 10/2014 | McLaughlin | ........... | H04L 63/08 726/6 |
| 2015/0215752 A1* | 7/2015 | Helferich | ............ | H04L 12/6418 455/412.1 |

* cited by examiner

*Primary Examiner* — Phuc Tran
*Assistant Examiner* — Soon-Dong D Hyun
(74) *Attorney, Agent, or Firm* — Zilka-Kotab, PC (57) ABSTRACT

A system, method, and computer program product are provided for determining geo-location of one or multiple User Equipment, that belong to the same subscriber subscription, that collectively are in simultaneous communication with a Cellular network and a Wi-Fi network. In use, it is determined that a subscriber utilizing at least one User Equipment is in simultaneous communication with at least one Cellular network and at least one Wi-Fi network. Cellular network measurement data associated with the at least one User Equipment is received. Additionally, Wi-Fi network measurement data associated with the at least one User Equipment is received. Further, the Cellular network measurement data and the Wi-Fi network measurement data are correlated to generate correlated measurement data associated with the at least one User Equipment. Moreover, the correlated measurement data is utilized to determine the geo-location of the at least one User Equipment, utilizing at least one geo-location determination algorithm and/or method, including and not limited to triangulation and correlation to Radio Frequency fingerprint.

7 Claims, 5 Drawing Sheets

SYSTEM, METHOD, AND COMPUTER PROGRAM FOR DETERMINING GEO-LOCATION OF USER EQUIPMENT FOR A SUBSCRIBER THAT IS IN SIMULTANEOUS COMMUNICATION WITH A CELLULAR NETWORK AND A WI-FI NETWORK

FIELD OF THE INVENTION

The present invention relates to geo-location position determination of User Equipment, and more particularly to improving geo-location determination accuracy of User Equipment.

BACKGROUND

Geo-location determination of User Equipment is utilized for a variety of software applications, etc. Traditionally, the geo-location of a User Equipment is determined utilizing a 3GPP location based service, an agent application present on the User Equipment, and/or utilizing only one of Cellular or Wi-Fi specific location techniques.

Each of these traditional geo-location determination techniques has issues. In the various cases, these issues may be associated with accuracy of the determined geo-location and/or increased battery drain of the device, etc.

There is thus a need for addressing these and/or other issues associated with the prior art.

SUMMARY

A system, method, and computer program product are provided for determining geo-location of one or multiple User Equipment, that belong to the same subscriber subscription, that collectively are in simultaneous communication with a Cellular network and a Wi-Fi network. In use, it is determined that a subscriber utilizing at least one User Equipment is in simultaneous communication with at least one Cellular network and at least one Wi-Fi network. Cellular network measurement data associated with the at least one User Equipment is received. Additionally, Wi-Fi network measurement data associated with the at least one User Equipment is received. Further, the Cellular network measurement data and the Wi-Fi network measurement data are correlated to generate correlated measurement data associated with the at least one User Equipment. Moreover, the correlated measurement data is utilized to determine the geo-location of the at least one User Equipment, utilizing at least one geo-location determination algorithm and/or method, including and not limited to triangulation and correlation to Radio Frequency fingerprint.

DETAILED DESCRIPTION

Figure 1:
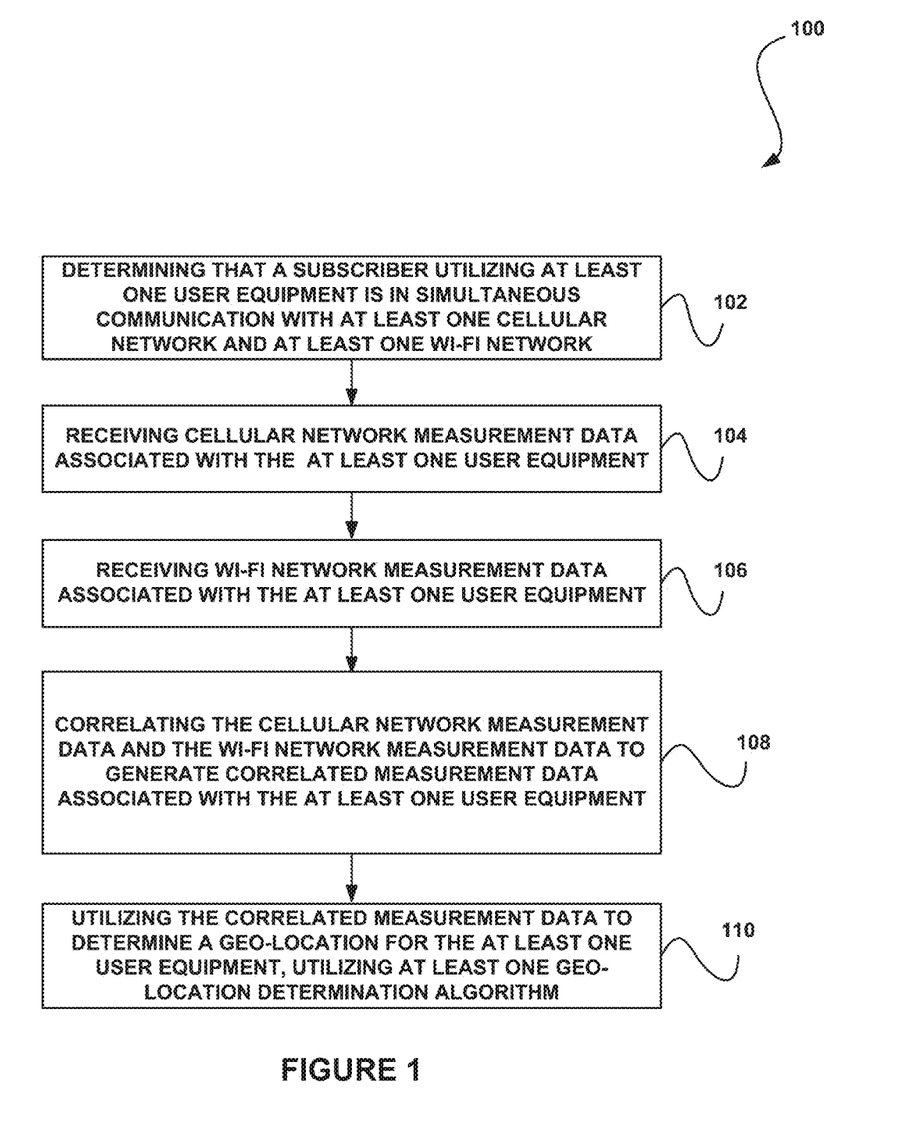
FIG. 1 illustrates a method for determining a geo-location of User Equipment that is in simultaneous communication with a Cellular network and a Wi-Fi network, in accordance with one embodiment.

FIG. 1 illustrates a method 100 for determining a geo-location of a User Equipment that is in simultaneous communication with a Cellular network and a Wi-Fi network, in accordance with one embodiment.

As shown, it is determined that a subscriber utilizing at least one User Equipment is in simultaneous communication with at least one Cellular network and at least one Wi-Fi network. See operation 102.

The User Equipment may include any device capable of connecting to a Cellular network and/or a Wi-Fi network. For example, in various embodiments, the User Equipment may include a mobile phone, a tablet computer, a handheld computed, a laptop computer, a gaming device, a device in an automobile, and/or any other user device. Further, in various embodiments, a single User Equipment may connect to the Cellular network and Wi-Fi network, or a first User Equipment may connect to the Cellular network and a second user equipment may connect to the Wi-Fi network. In the case of multiple User Equipment, the collective User Equipment may be in simultaneous communication with at least one Cellular network and at least one Wi-Fi network.

It may be determined that the subscriber utilizing the User Equipment is in communication with the Wi-Fi network and the Cellular network utilizing a variety of techniques. For example, determining the subscriber utilizing the User Equipment is in communication with the Cellular network or the Wi-Fi network may include determining the user device is polling a system associated with the Cellular network or the Wi-Fi network, respectively. As another example, determining the subscriber utilizing the User Equipment is in communication with the Cellular network or the Wi-Fi network may include determining the User Equipment is in communicatively connected to a system associated with the Cellular network or the Wi-Fi network, respectively.

As shown further in FIG. 1, Cellular network measurement data associated with the User Equipment is received. See operation 104. The Cellular network measurement data may include any measurement data associated with one or more Cellular networks.

For example, the Cellular network measurement data associated with the User Equipment may include a signal strength associated with the User Equipment. As another example, the Cellular network measurement data associated with the User Equipment may include a timing advance associated with the user device. As another example, the Cellular network measurement data associated with the User Equipment may include a signal delay associated with the User Equipment.

Additionally, Wi-Fi network measurement data associated with the User Equipment is received. See operation 106. The Wi-Fi network measurement data may include any measurement data associated with one or more Wi-Fi networks.

For example, the Wi-Fi network measurement data associated with the User Equipment may include a signal strength associated with the User Equipment. As another example, the Wi-Fi network measurement data associated with the User Equipment may include a signal delay associated with the User Equipment.

Further, the Cellular network measurement data and the Wi-Fi network measurement data are correlated to generate correlated measurement data associated with the User Equipment. See operation 108. Moreover, the correlated measurement data is utilized to determine a geo-location for the mobile device, utilizing at least one geo-location detection algorithm and/or methods, including and not limited to triangulation and correlation to Radio Frequency fingerprint. See operation 110.

In one embodiment, correlating the Cellular network measurement data and the Wi-Fi network measurement data to generate the correlated measurement data associated with the User Equipment may include associating the correlated measurement data to a known subscriber identifier and the User Equipment. In this case, the known subscriber identifier may include an International Mobile Subscriber Identity (IMSI).

In another embodiment, correlating the Cellular network measurement data and the Wi-Fi network measurement data may include correlating the Cellular network measurement data utilizing the IMSI associated with the User Equipment and correlating the Wi-Fi network measurement data utilizing a media access control (MAC) address.

Additionally, in one embodiment, the method 100 may further include requesting authentication from the User Equipment. In this case, credentials associated with the User Equipment may be received in response to requesting the authentication. Further, user profile information may be retrieved from a subscriber database utilizing the credentials associated with the User Equipment.

Utilizing the profile information, a subscriber Mobile Station International Subscriber Directory Number (MSISDN) and an IMSI associated with the User Equipment may be identified. Furthermore, a media access control (MAC) address associated with the mobile device may be identified. In this case, the subscriber MSISDN and the IMSI associated with the mobile device may be correlated with the MAC address associated with the User Equipment.

In one embodiment, a correlation mapping applicability for MAC+IMSI based correlation may be qualified or disqualified. Additionally, rules may be implemented to establish the correct one-to-one MAC to IMSI relationships based on measurement location proximity.

Utilizing the method 100, a system may function to facilitate improved geo-location positioning accuracy, through a process that correlates non-intrusive network collected measurement data when User Equipment (e.g. a smart phone, etc.) is simultaneously communicating with and/or polling Cellular and Wi-Fi networks. User Equipment positioning details are then available to other systems and/or processes.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Various techniques may be utilized for determining a geo-location for User Equipment. For example, triangulation via network measurements may be utilized. Utilizing this technique, a system may collect, decode, and correlate data associated with the User Equipment (i.e. various user devices, etc.) from either Cellular or Wi-Fi data sources, without the knowledge of the user (e.g. using network measurements of User Equipment such as received-signal-strength/timing-advance from multiple radio systems, etc.) to triangulate the approximate position of the User Equipment. In the past, triangulation has not been implemented utilizing information from both Cellular and Wi-Fi sources.

Utilizing triangulation, geo-location accuracy of User Equipment is dependent on many factors, including, for example, the number of radio systems (e.g. cell towers, etc.) that are in range of the user equipment, and the size of the radio coverage footprint. Cellular measurements are typically not absolute values but numerical indicator that can be interpreted as range, such as in $n^{ths}$ of the cell radius, etc. Additionally, in areas where overlapping radio coverage density is high and the radio coverage footprint is small, accuracy of about 25 meters is possible for Cellular and about 10 meters for Wi-Fi (used independently).

Another technique for determining a geo-location for a User Equipment includes a 3GPP Location Based Service. This includes a core functionality of a cellular subsystem, designed to support a small number of ad-hoc location queries (e.g. to aid E911/E112 emergency services and support lawful intercept, etc.).

Another technique for determining a geo-location for a device includes user equipment agent applications. This may include an application that is actively running on the user equipment that invokes APIs of the device operating system to query position. Results may be collected by a central server. In this case, accuracy depends on the capabilities of the user equipment and operating system, and can include GPS, Wi-Fi and a cell ID.

The agent applications are commonly used by social media/crowd souring applications. However, the use of agent applications by the Service Providers has proven problematic as a means to geo-locate and measure user equipment experience, for various reasons, including drain on the battery (e.g. by invoking GPS).

Accordingly, the techniques described herein offer an improved geo-location positioning accuracy by correlating Cellular and Wi-Fi network measurement data (non-intrusively) to a single authenticated subscriber identifier and associated user equipment device (e.g. smart phone, etc.), when the User Equipment is simultaneously attached/scanning Cellular and Wi-Fi networks.

Utilizing these techniques, in one embodiment, Cellular and Wi-Fi measurements may be correlated using a subscriber IMSI. In another embodiment, cellular and Wi-Fi measurements may be correlated using a subscriber MAC and IMSI. Additionally, in one embodiment, correlation mapping applicability may be qualified or disqualified for MAC and IMSI based correlation. Accordingly, improved geo-location accuracy analytic methods may be realized that use combined Cellular and Wi-Fi measurement data.

Moreover, utilizing these techniques, geo-location accuracy of sub 10 meter in locations where there is overlapping cellular and Wi-Fi coverage (multiple radio sources) may be achieved, as opposed to approximately 25 meter geo-location accuracy available today using pure Cellular network measurements. Additionally, such implementation does not require a software agent to be running on the User Equipment and applies to all User Equipment, irrespective of technology, vendor and device operating system. No software agent means there is no dependency on device GPS, which means no device battery drain, and no additional over-air data transmissions.

Improved geo-location accuracy, combined with the ability to constantly measure User Equipment radio bearer/application Quality of Experience (QoE), enables the Service Providers to produce more accurate experience geographical maps (known as heat maps), which in turn facilitates more accurate Network Planning, the placement of new radio infrastructure, for greatest QoE & ROI. Furthermore, this facilitates more accurate SON (Self-Organizing Network) optimization algorithms, for improved QoE; the support of tiered location and time of day QoE policy based product offerings: improved customer care, with knowledge of users geo-located QoE; and enables Service Providers to sell anonymous crowd/foot sourcing analytics to third parties.

Figure 2:
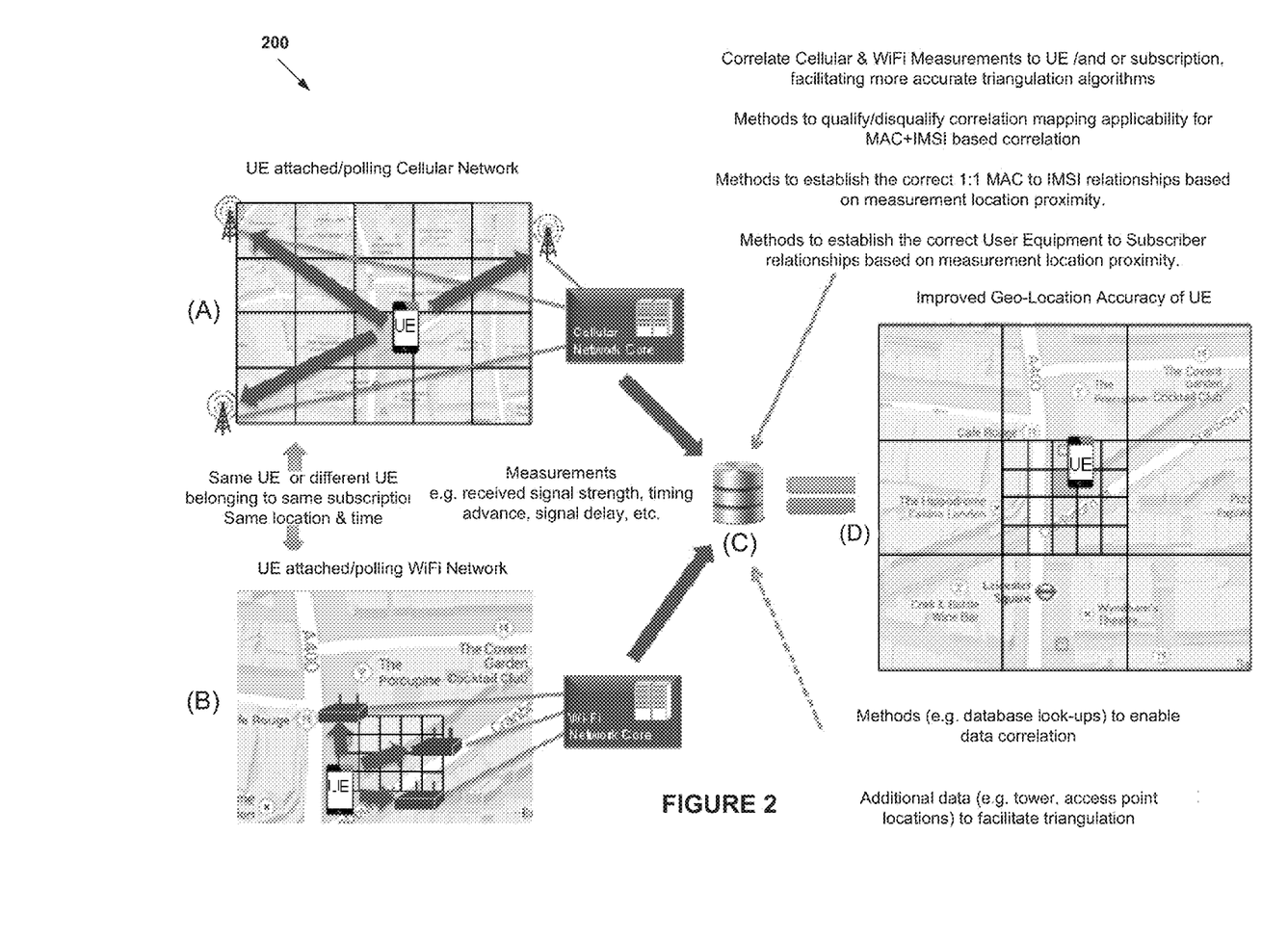
FIG. 2 illustrates a system flow for determining a geo-location of a User Equipment that is in simultaneous communication with a Cellular network and a Wi-Fi network, in accordance with one embodiment.

FIG. 2 illustrates a system flow 200 for determining a geo-location of a user device that is in simultaneous communication with a cellular network and a Wi-Fi network, in accordance with one embodiment. As an option, the system flow 200 may be implemented in the context of the details of FIG. 1. Of course, however, the system flow 200 may be implemented in the context of any desired environment. Further, the aforementioned definitions may equally apply to the description below.

As shown in FIG. 2, User Equipment (UE) that is simultaneously in communication with and/or polling Cellular and WiFi Networks. As shown in step A, an authenticated UE attaches to a cellular network. Measurements associated with the UE are collected (e.g. received single strength, etc.). In this case, the UE is identified by a temporary IMSI (TIMSI) and post correlated to IMSI.

As shown in step B, the UE actively scans for available Wi-Fi radio systems (i.e. Access Points, etc.). The Wi-Fi Access Point is constantly listening for UE probe requests. Based on received probe requests, the Wi-Fi Access Point collects measurements about the UE (e.g. received single strength, etc.). Further, the UE may be identified by the IMSI, or by the MAC address.

As shown in step C, a system collects the UE measurement data from step A and step B. The UE cellular and Wi-Fi measurements are correlated to a known subscriber identifier (e.g. IMSI) and a single UE device (e.g. a smart phone, etc.).

In one embodiment, the correlation method may include an IMSI based correlation. In this case, rules enabling direct correlation of UE measurement may result in using the subscriber IMSI, where authentication is achieved using protocols including and not limited to, EAP-SIM, EAP-AKA and EAP-AKA'.

In another embodiment, the correlation method may include a MAC+IMSI based correlation. In this case, rules to correlate Cellular measurement data by IMSI with Wi-Fi measurement data by a MAC address (e.g. when authentication is achieved using protocols including and not limited to EAP-POTP, EAP-TLS and EAP-IKEv2, etc.), may be used to maintain and look-up the UE device and subscriber subscription relationship details in a system (e.g. a database, etc.).

As an example, when a UE connects to Wi-Fi and the Wi-Fi access network finds out that the UE is not authenticated, the UE may be redirected to an authentication system. The UE passes credentials to the authentication system and the authentication system retrieves a user profile from a subscriber database. In the subscriber database, a user profile is linked to a subscriber MSISDN and IMSI. This enables a mapping relationship between UE Wi-Fi MAC address and UE cellular MSISDN/IMSI to be established.

In another embodiment, a correlation mapping applicability for MAC+IMSI based correlation may be qualified or disqualified. Additionally, rules may be implemented to establish the correct one-to-one MAC to IMSI relationships based on measurement location proximity.

As an example, it is common practice that a user is permitted to simultaneously authenticate the connection of multiple Wi-Fi devices (i.e. UEs) to the same subscription/account. In this scenario, it is feasible that an N: 1 (or even N:N) relationship may exist between multiple Wi-Fi MAC addresses and the cellular MSISDN/IMSI.

These rules may optionally provide support for learning over time. For example, during initial measurements, multiple UEs may be collocated at the same location making it harder to establish the correct one-to-one relationship. Overtime as one or more UEs move, location proximity rules will enable the mapping relationships to be updated.

With further reference to FIG. 2, step D depicts the improvement achieved in geo-locating the UE utilizing more measurement data samples (both cellular and Wi-Fi).

Figure 3:
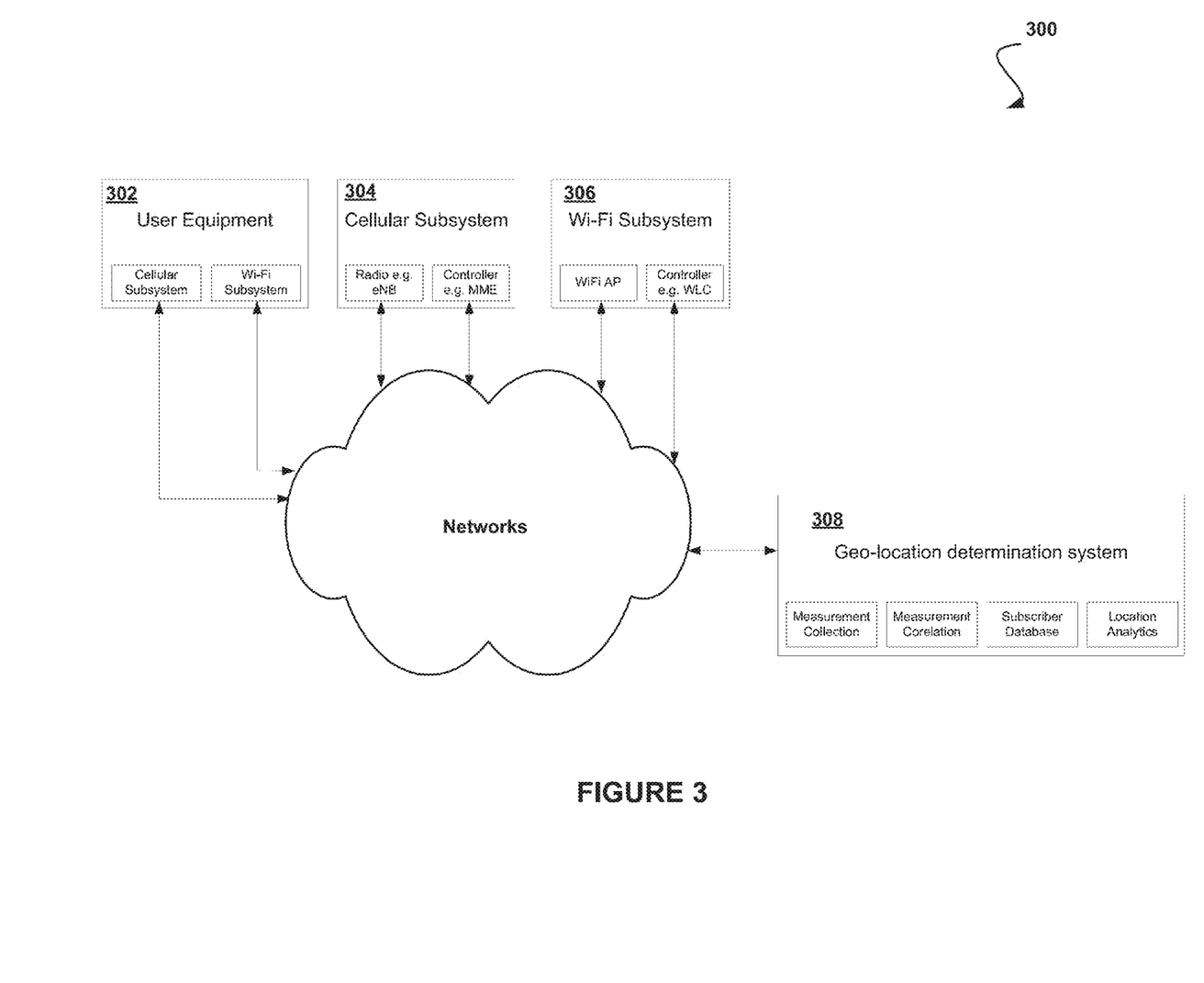
FIG. 3 illustrates a system for determining a geo-location of a User Equipment that is in simultaneous communication with a Cellular network and a Wi-Fi network, in accordance with one embodiment.

FIG. 3 illustrates a system 300 for determining a geo-location of a user device that is in simultaneous communication with a cellular network and a Wi-Fi network, in accordance with one embodiment. As an option, the system 300 may be implemented in the context of the details of the previous Figures. Of course, however, the system 300 may be implemented in the context of any desired environment. Further, the aforementioned definitions may equally apply to the description below.

As shown, the system 300 includes user equipment 302 in communication with a cellular subsystem 304 and a Wi-Fi subsystem 306. Furthermore, a geo-location determination system 308 receives location information associated with the user equipment 302, which includes Cellular location data and Wi-Fi location data, and uses the location information to determine a geo-location of the user equipment 302.

Figure 4:
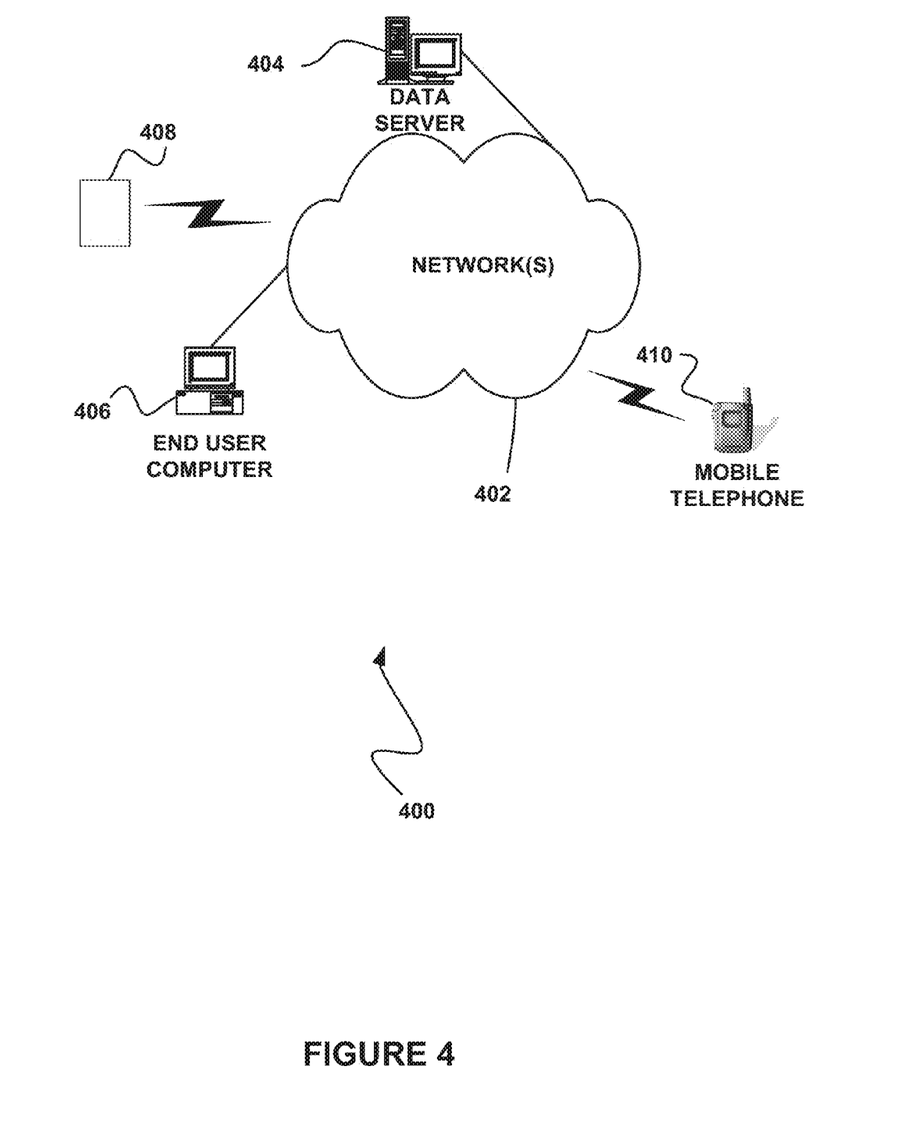
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a tablet computer 408, a mobile phone device 410, etc.

Figure 5:
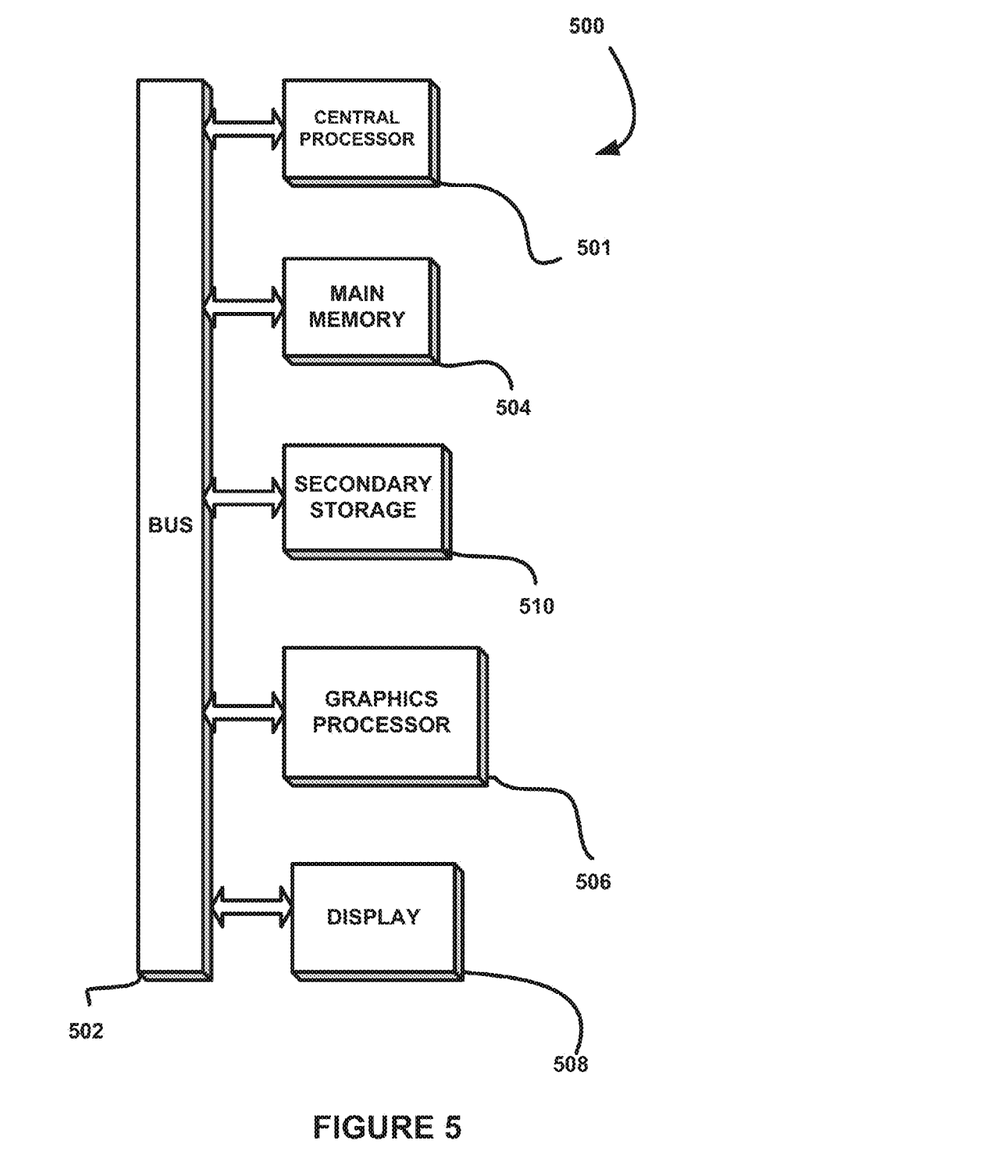
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:
   determining that a subscriber utilizing a mobile device is in simultaneous communication with at least one cellular network and at least one Wi-Fi network;
   receiving cellular network measurement data associated with the mobile device, the cellular network measurement data including a cellular signal strength associated with the mobile device and a timing advance associated with the mobile device;
   receiving Wi-Fi network measurement data associated with the mobile device, the Wi-Fi network measurement data including a Wi-Fi network signal strength and a signal delay associated with the mobile device;
   requesting authentication from the mobile device;
   receiving credentials associated with the mobile device, in response to requesting the authentication;
   retrieving user profile information from a subscriber database, utilizing the received credentials;
   identifying a Mobile Station International Subscriber Directory Number (MSISDN), an International Mobile Subscriber Identity (IMSI), and a media access control (MAC) address associated with the mobile device, utilizing the user profile information;
   correlating the cellular network measurement data and the Wi-Fi network measurement data to generate correlated measurement data associated with the mobile device, including:
      correlating the cellular network measurement data to the subscriber using the IMSI associated with the mobile device, and
      correlating the Wi-Fi network measurement data to the subscriber using a MAC address associated with the mobile device; and
   utilizing all the correlated measurement data to determine a geo-location for the mobile device, utilizing at least one geo-location determination algorithm.

2. The computer program product of claim 1, further comprising determining the mobile device is polling a system associated with the at least one cellular network.

3. The computer program product of claim 1, further comprising determining that the mobile device is in communicatively connected to a system associated with the at least one Wi-Fi network.

4. The computer program product of claim 1, further comprising computer code for qualifying or disqualifying a correlation mapping applicability for MAC+IMSI based correlation.

5. The computer program product of claim 1, further comprising computer code for generating rules to establish a correct one-to-one MAC to IMSI relationship based on measurement location proximity.

6. A method, comprising:
   determining that a subscriber utilizing a mobile device is in simultaneous communication with at least one cellular network and at least one Wi-Fi network;
   receiving cellular network measurement data associated with the mobile device, the cellular network measurement data including a cellular signal strength associated with the mobile device and a timing advance associated with the mobile device;
   receiving Wi-Fi network measurement data associated with the mobile device, the Wi-Fi network measurement data including a Wi-Fi network signal strength and a signal delay associated with the mobile device;
   requesting authentication from the mobile device;
   receiving credentials associated with the user mobile device, in response to requesting the authentication;
   retrieving user profile information from a subscriber database, utilizing the received credentials;
   identifying a Mobile Station International Subscriber Directory Number (MSISDN), an International Mobile Subscriber Identity (IMSI), and a media access control (MAC) address associated with the mobile device, utilizing the user profile information;
   correlating the cellular network measurement data and the Wi-Fi network measurement data to generate correlated measurement data associated with the mobile device, including:
      correlating the cellular network measurement data to the subscriber using the IMSI associated with the mobile device, and
      correlating the Wi-Fi network measurement data to the subscriber using a MAC address associated with the mobile device; and
   utilizing all the correlated measurement data to determine a geo-location for the mobile device, utilizing at least one geo-location determination algorithm.

7. A system comprising:
   a memory system; and
   one or more processing cores coupled to the memory system and that are each configured for:
   determining that a subscriber utilizing a mobile device is in simultaneous communication with at least one cellular network and at least one Wi-Fi network;
   receiving cellular network measurement data associated with the mobile device, the cellular network measurement data including a cellular signal strength associated with the mobile device and a timing advance associated with the mobile device;
   receiving Wi-Fi network measurement data associated with the mobile device, the Wi-Fi network measurement data including a Wi-Fi network signal strength and a signal delay associated with the mobile device;
   requesting authentication from the mobile device;
   receiving credentials associated with the mobile device, in response to requesting the authentication;
   retrieving user profile information from a subscriber database, utilizing the received credentials;
   identifying a Mobile Station International Subscriber Directory Number (MSISDN), an International Mobile Subscriber Identity (IMSI), and a media access control (MAC) address associated with the mobile device, utilizing the user profile information;
   correlating the cellular network measurement data and the Wi-Fi network measurement data to generate correlated measurement data associated with the mobile device, including:
      correlating the cellular network measurement data to the subscriber using the IMSI associated with the mobile device, and
      correlating the Wi-Fi network measurement data to the subscriber using a MAC address associated with the mobile device; and utilizing all the correlated measurement data to determine a geo-location for the mobile device, utilizing at least one geo-location determination algorithm.

* * * * *